United States Patent [19]

Böhle et al.

[11] Patent Number: 4,781,997

[45] Date of Patent: Nov. 1, 1988

[54] STORAGE BATTERY THAT IS PROTECTED AGAINST THE DISCHARGE OF ACID

[75] Inventors: Christian Böhle, Soest; Eberhard Nann, Deiringsen; Ulrich Römling, Meckingsen, all of Fed. Rep. of Germany

[73] Assignee: Hagen Batterie AG, Fed. Rep. of Germany

[21] Appl. No.: 940,029

[22] Filed: Dec. 5, 1986

[30] Foreign Application Priority Data

Dec. 6, 1985 [DE]  Fed. Rep. of Germany ....... 3543617

[51] Int. Cl.[4] .............................................. H01M 2/14
[52] U.S. Cl. ...................................... 429/144; 429/146
[58] Field of Search ............... 429/142, 143, 144, 145, 429/146, 147

[56] References Cited

U.S. PATENT DOCUMENTS

| 3,172,782 | 3/1965 | Jache | 429/147 |
| 4,096,317 | 6/1978 | Annen | 429/145 |
| 4,137,377 | 1/1979 | McClelland | 429/145 |
| 4,618,545 | 10/1986 | Clegg et al. | 429/143 |

Primary Examiner—Donald L. Walton
Attorney, Agent, or Firm—Salter & Michaelson

[57] ABSTRACT

The invention concerns a storage battery that is protected against the discharge of acid, with fleece separators which completely fill the space between the electrode plates. It is proposed that spacers be built into the fleece separators during a preliminary production step of the separator material. These spacers have support surfaces which are situated at least on one side of the separator material below the surface of said separator material and which preferably extend approximately parallel to the surface of the separator material. The spacers can be fixed in position by a preferably very thin and wide-meshed screen that has been worked into the separator material.

7 Claims, 1 Drawing Sheet

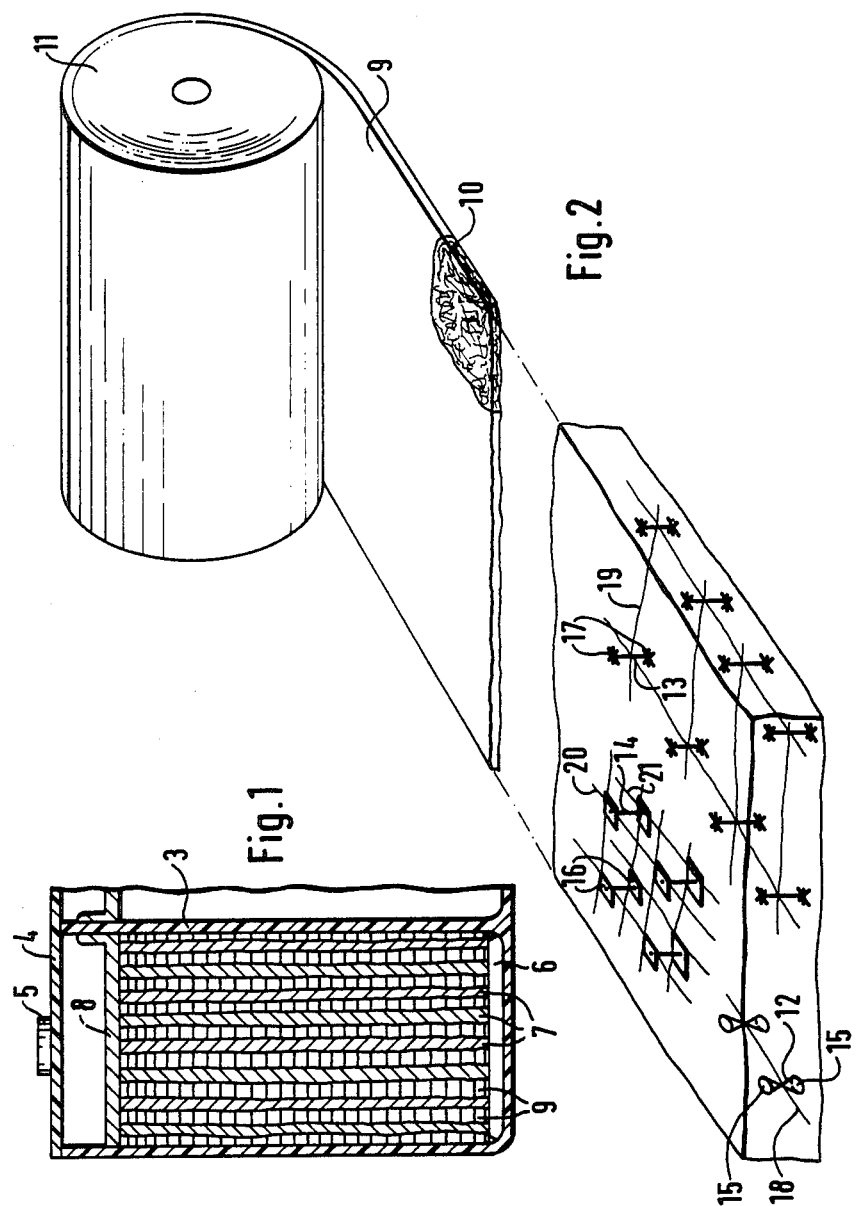

STORAGE BATTERY THAT IS PROTECTED AGAINST THE DISCHARGE OF ACID

BACKGROUND AND SUMMARY OF THE INVENTION

The invention concerns a storage battery that is protected against the discharge of acid, with a compressible, microporous, and capillary separator material disposed between the electrode plates. This material completely fills up the space between the electrode plates and absorbs the electrolyte that is present in the storage battery cell. Such storage batteries are known, for example, from the German Patent Specification DE-OS No. 31 06 203.

The separator material consists of microfibers, e.g. microglass-fibers, which have been processed into mats or fleeces and which are offered commercially as strip goods in rolled form (e.g. AGM=Absorptive Glass Mat from Evants Products Company, U.S.A.)

As regards the arrangement of the separator material between the negative and positive electrode plates, it is considered important that the separator material contacts the plates completely and with an intimate contact, so that the surfaces of the electrode plates are adequately supplied with electrolyte in their entirety, for the electrochemical processes. To improve this contact, the plate sets with the separator material in between are built into the storage battery cells in a tight-fitting fashion, i.e., under a certain passage, during the manufacturing process of the storage batteries. However, this requires greater care in the assembly and production process, since the compressible separator material may not be compressed too severely over its entire surface or in local component areas. Otherwise, its capacity for taking up electrolyte is reduced, or shortcircuits can occur between the positive and negative electrode plates.

To maintain a certain minimum distance between the electrode plates, the German Patent Specification DE-AS No. 11 94 015 already proposed to encase the individual electrodes with a fleece material, and to dispose spacers between the electrode plates, which cause the fleece material to lie against the electrode plates and simultaneously maintain the electrode plates at a distance with respect to one another. However, it was presupposed that each plate had its own fleece encasement, so that the spacers could be disposed between the encased plates. The intermediate space between the encased electrode plates, which was bridged over by the spacers, thus remained free of separator material.

However, this technique is not useful for storage batteries that are protected against the discharge of acid, of the type mentioned in the introduction, since here the space between the electrode plates must be completely filled up with a microporous separator material. Also, the mechanical handling of the separator material, as proposed in the German Patent Specification DE-AS No. 11 94 015, would not be feasible with the storage batteries according to the type described here, since the required and actually used microporous mass of fleeces had very fine fibers and mechanically can sustain no stress at all. They already tear under simple mechanical handling and, especially in the mass production of starters batteries, cause considerable breakdowns both in the manufacture and in the operation of the storage batteries.

The aim of the invention therefore is to propose a teaching for the technical handling of storage batteries of the type defined in the introduction. This teaching will show how, despite the required use of a microporous and mechanical unstressable separator material, one can guarantee consistent production quality and a shortcircuit-proof operation of the storage batteries.

According to the invention, this aim is achieved by spacers being present between the electrode plates, in a manner that is in itself well known, but where the spacers are built into the separator material during a preliminary production step of the separator material, and where said spacers have support surfaces which are situated at least on one side of the separator material below the surface of this separator material, and which preferably extend approximately parallel to the surface of the separator material. Here, a suitable embodiment of the invention provides that the support spacing of the support surfaces of the spacers is up to 70% but preferably 20% to 50% smaller than the thickness of the uncompressed separator material, and thus the support surfaces of the spacers clearly lie below the surface of the separator material either on one side or on both sides of the separator material.

A storage battery according to the invention can be fabricated without any problem, and specifically even if the electrode plates with the separator material in between are multiply stacked above one another during the production process. The spacers that are integrated into the separator material prevent the undesirable strong compression of the highly porous separator material. Optimal contact between the pasting compound of the electrode plates and the separator material exists if, according to an advantageous development of the invention, the support spacing of the support surfaces is scaled in such a way relative to the thickness of the uncompressed separator material, that, after compression of the plate set, the separator material contacts the electrode plates with a defined surface pressure of maximally 80 kg/dm$^2$ but preferably 20 to 60 kg/dm$^2$. Here, the prescribed plate spacings are adhered to exactly.

This is also true if slightly bent or distorted electrode plates must be processed during the production process. Such plates occur again and again, for example, due to special conditions during casting the grid plates or during formation of the plates. Up to now, the bent or distorted plates had to be removed from the production sequence and had to be aligned, with considerable effort; otherwise, there was a risk that the excessively compressed separator material in the area of the distortion or bending would favor lead dendrites going through from the negative to the positive electrode plate. This could cause a shortcircuit between the electrode plates already after a few working cycles.

Now this danger has been eliminated. In the manufacture of the storage battery according to the invention, distorted or bent plates are aligned flat through the spacers that are built into the separator material. This happens automatically when the sets of plates are stacked. Thus, the prescribed plate spacings are adhered to exactly over the entire surface of the electrode plates.

It is here of special importance that the spacers with their mechanical action are not supported directly against the electrode plates, at least on one side or preferably on both sides, but have their support surfaces lying within the separator material, so that sufficient separator material is present between the support surfaces and the plates. In this way, electrolyte will be conducted to the plate surfaces, and oxygen can adequately diffuse to the negative plate surface even in the region of the spacer. This is improved still further if, according to an advantageous embodiment of the invention, the spacers consist of a porous and preferably highly porous material, such as, e.g. a porous sintered body or a porous hard foam.

The fact that the electrolyte is guaranteed to be conducted to the entire plate surface, in combination with the exactly maintained plate spacings, now also makes it possible to fabricate without any problem high-power batteries that are leakproof against the discharge of acid. With high-power batteries, one strives for plate spacings of only 0.5 mm, which can actually be achieved according to the inventive teaching.

The spacers that are built into the separator material have a support surface, e.g. over the entire area or in the form of a support cross, which extends preferably about parallel to the surface of the separator material and thus parallel to the plate surface. In this way, an undesirable excessive compression of the separator material that is situated before the support surfaces, as well as the undesirable penetration of the support surfaces into the relatively soft pasting compound of the electrode plates, is prevented. Incidentally, the spacers can be designed in any desired shape, e.g. as polyhedrons, and can be disposed in a regular or irregular distribution over the surface of the separator material. They must be electric insulators and must be resistant against acid.

The spacers can be built into the separator material, e.g. by extruding plastic particles into it or, e.g. by local injection of binders which subsequently harden in the separator material. From the point of view of production engineering, the inclusion of the spacers in the separator material is especially simple if it is accepted that the support surfaces of the spacers on one side of the separator material lie flush in the surface of the separator material. In this case, the spacers can simply be sludged in, e.g. when the fleeced strip material is being fabricated.

Building in the spacers also decisively improves the mechanical loadability of the separator material, which generally is produced as rolled goods. The separator material is formed from microfibers in the form of a fleece and receives a certain strength, e.g. by extruding the plastic particles into it or by injecting binders. Thus, it is easier to handle during the production operation and does not tear so easily, e.g. when it is pulled off the roll.

The spacers can be connected together within the separator material, e.g. like beads on a string. This results both in fixing the position of the spacers and also in improving the mechanical loadability of the separator material.

An especially advantageous embodiment of the invention provides that the spacers which are built into the separator material during the preliminary production stage thereof are fixed in position by a net or a screen which preferably is very thin and wide-meshed. This can be done during the preliminary production stages of the separator material, e.g. by spinning a fleece of microfibers about a net or screen, at whose crossing points the spacers are disposed and are attached to the net or screen. Such nets or screens, which preferably are very thin and wide-meshed, and which extend in the transverse and longitudinal direction of the separator material, hinder neither oxygen diffusion to the negative plate nor the electrolyte take-up capacity of the separator material. But, in addition to fixing the position of the spacers, they simultaneously have the important advantage that the finefibered mats or fleeces of microfibers, which intrinsically can withstand almost no mechanical stress, now are indeed able to accept adequate tensile forces in the plane of their surface extent. Handling a separator material that has been finished in this way thus becomes much simpler. For instance, the separator material can be pulled directly off the roll during automatic production of the storage batteries, without the rolls themselves requiring an expensive and controlled drive, which previously had to be regarded as necessary to prevent the easily destroyed separator material from tearing. Now, despite the fact that the separator material is handled under tensile stress during the production of the storage batteries, an undisturbed connected and closed structure of the separator material between the electrode plates can be guaranteed, a structure that is free from internal cracks or deformations and which thus guarantees high-power and shortcircuit-free operation of the inventive storage batteries.

DESCRIPTION OF THE DRAWING

Embodiments of the invention are described in more detail below in terms of the drawing. The following are shown:

FIG. 1 shows a cross-section through an inventive storage battery.

FIG. 2 is a perspective view, partially magnified, of the separator material for use in the storage battery according to FIG. 1.

DESCRIPTION OF THE INVENTION

FIG. 1 shows the generic type of storage battery which is protected against the discharge of acid, with the cell vessel 3, which is closed by means of a cover 4. The cell interlock 5 is situated in the cover 4, for example as an overpressure valve.

What is shown are the alternatingly positive and negative electrode plates 7, which are standing on a floor strip 6. Here, the electrode plates of the same polarity are connected together in the usual fashion by means of an upper bus bar 8.

The intermediate spaces between the electrode plates 7 are completely filled with a microporous and capillary separator material 9, which absorbs the electrolyte present in the storagebattery cell. Here, the quantity of electrolyte present in the storage-battery cell is scaled in such a fashion that no free, non-absorbed electrolyte is present in the cell.

FIG. 2 shows, in a perspective representation, more precise details of the separator material 9. In its basic structure, this material consists of microfibers 10, which are processed into a compressible, microporous, and capillary fleece. During the production of an inventive storage battery according to FIG. 1, the fleece is generally present in the form of a roll 11, as shown in FIG. 2. The required fleece is pulled off this roll and is cut to the desired format as separator material. When the plate sets are formed, it is inserted between the individual electrode plates.

The forward end, as shown in FIG. 2, of the strip goods that are running off the roll 11 is shown magnified, so that the inventive characteristics can be clarified better.

According to the invention, the separator material 9, which is disposed between the electrode plates 7, is equipped with spacers 12, 13, or 14. These are built into the separator material during the preliminary production thereof. They have support surfaces 15, 16, or 17, which are situated below the surface of the separator material and which have a certain extent approximately parallel to the surface of the separator material.

In a preferred embodiment of the invention, the support spacing of the support surfaces 15, 16, 17 from one another is about 20% to 50% smaller than the thickness of the uncompressed separator material which is shown here. As can be seen from the picture, the support surfaces of the spacers that have been built into the separator material thus lie clearly below the surface of said separator material. The spacers can be designed in various shapes, as is demonstrated, for example, by way of the shown spacers 12, 13, 14. The spacer 12 consists e.g. of plastic double cones, whose base surfaces form the support surfaces 15. Further shown are the spacers 14 which have a web with end plates 16, forming the support surfaces. As regards the spacers 13, the support surfaces are formed by transverse webs in cross-shape form.

The picture according to FIG. 2 also shows that the individual spacers are connected together within the separator material. In the embodiment shown, this is done by means of very thin threads, e.g. consisting of an acid-proof plastic, but glass fibers or the like can also be used.

The threads are preferably linked to form a net or a screen. They fix the position of individual spacers at predetermined longitudinally and transversely spaced positions within the separator material and, in addition, they have the advantage of decisively increasing the mechanical strength of the separator material.

In the embodiment shown, the spacers 12 are strung on a thread 18 which is spun into the fleece during a preliminary production step for the separator material 9.

The spacers 13 are fixed in position by a very fine and wide-meshed screen 19. The screen 19 is able to sustain tensile forces in different directions, for example in the plane of the surface extent of the strip goods of the separator material 9.

The spacers 14 are fixed in position with a double screen 20 and 21. It is obviously intelligible that a double screen withstands larger tensile stresses so that, when the separator material is pulled from the roll 11, undesired distortions, tearing, or internal cracks can in no case occur in the separator material.

The separator material has been described in detail above in terms of FIG. 2. When the storage battery according to FIG. 1 is being fabricated, it is disposed between the electrode plates 7 without the need of any further processing. It guarantees that the required plate spacing will be maintained, and, in some circumstances, it also guarantees the flat alignment of bent or distorted electrode plates as well as outstanding electrochemical values. Thus, according to the teaching of the invention, highpower batteries that are protected against the discharge of acid can be fabricated, which can also be produced with horizontal electrode plates of rather large dimensions, if this should be needed.

What is claimed is:

1. In a storage battery of a type including a liquid electrolyte, a pair of spaced electrode plates in said electrolyte, a microporous capillary separator member between said electrode plates, said electrolyte being absorbed in said separator member so that said separator member operates to prevent the discharge of electrolyte from said battery, the improvement comprising said separator member comprising a single flexible sheet of separator material which substantially fills the area between said electrode plates, a plurality of spaced individual spacer elements embedded in said sheet of separator material and a thin flexible net embedded in said sheet of separator material maintaining said spacer elements in predetermined longitudinally and transversely spaced positions therein.

2. In the storage battery of claim 1, said spacers consisting of a porous material.

3. In the storage battery of claims 2 or 1, said spacers each having a pair of opposite support surfaces thereon which are disposed in substantially parallel relation to and below the level of opposite surfaces of said separator material, the spacing between the opposite support surfaces of said spacers being up to 70% less than the thickness of the separator material in an uncompressed state.

4. In the storage battery of claim 3, the spacing between the opposite support surfaces of said spacers being between 20% and 50% less than the thickness of the separator material in an uncompressed state.

5. In the storage battery of claim 3, the spacing between the opposite support surfaces of said spacers relative to the thickness of the separator material in an uncompressed state being such that the separator material contacts the electrode plates with a surface pressure of less than 80 kg/dm$^2$.

6. In the storage battery of claim 3, the spacing between the opposite support surfaces of said spacers relative to the thickness of the separator material in an uncompressed state being such that the separator material contacts the electrode plates with a surface pressure of between 20 kg/dm$^2$ and 60 kg/dm$^2$.

7. In the storage battery of claim 1, said spacers consisting of a highly porous material

* * * * *